3,000,571
Patented Sept. 19, 1961

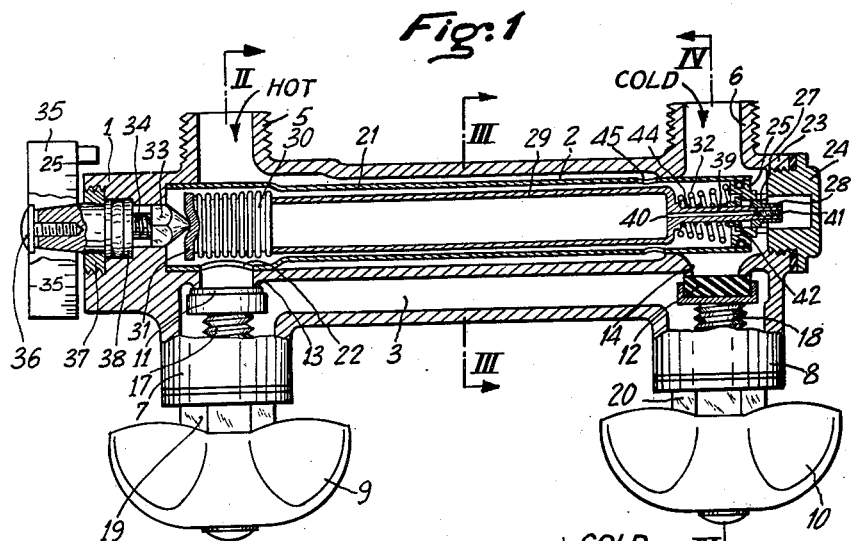
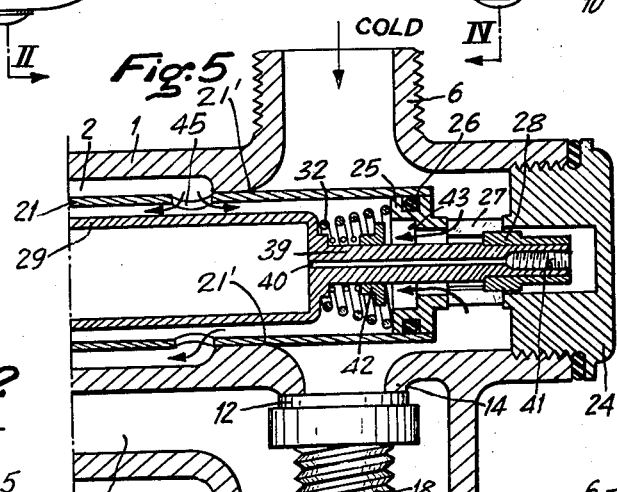
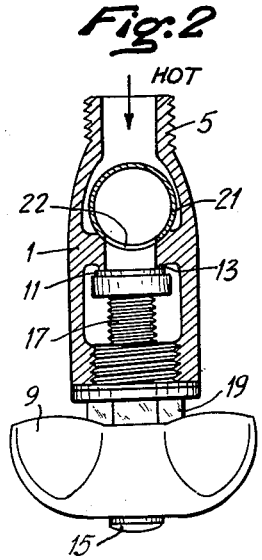
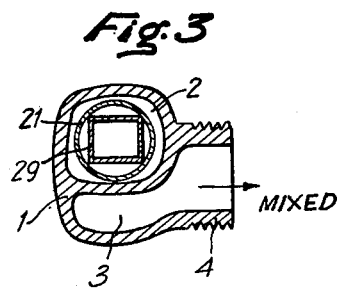
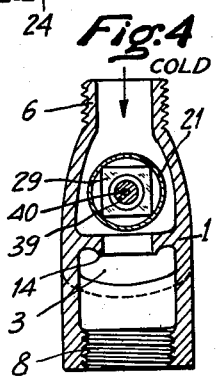
INVENTORS
NICOLE FRESSON BORN TRUBERT
AND DENIS TRUBERT
By Linton and Linton ATTORNEYS

1

3,000,571
MIXING COCK WITH THERMOSTATIC COLD-WATER COMPENSATION
Nicole Fresson, born Trubert, 34 Rue Raphael-Corby, and Denis Trubert, 6 Ave. du General-Gouraud, both of Viroflay, Seine-et-Oise, France
Filed Jan. 7, 1959, Ser. No. 785,416
Claims priority, application France Jan. 11, 1958
4 Claims. (Cl. 236—12)

This invention relates to water mixing cocks of the type supplied with hot and cold water and adapted to deliver water at the desired temperature lower than the hot water supplied thereto. The essential feature of this mixing device is that an external knob or like control member is provided for adjusting according to the desired water temperature a thermostatic member immersed in a chamber of the device which receives both the hot water from the supply and a complementary quantity of cold water controlled by the expansion of the thermostatic member.

A mixing device of this character is particularly suitable for domestic use, for example in installations wherein the hot water is supplied from a bath-heater or a water-heater of the instantaneous gas type from which the user will constantly take the maximum hot-water output, this apparatus being adjusted to deliver water at the desired maximum temperature. However, this invention is applicable to many different cases, for example whenever it is desired to provide a water or other liquid circulation at a given or predetermined temperature while a source of hot water having a temperature equal to or higher than the desired temperature is available. According to another possible application of this invention, it is possible to adjust automatically the temperature of the cooling water circuit of a power electron tube by adding cold waer to the water heated by this tube.

According to a complemental characteristic of this invention the mixing device is combined into a common body with a hot-water cock and a cold-water cock, and comprises upstream of the valve member of each cock, between the cold-water inlet and the hot-water inlet, a passage of which the cross-sectional area is controlled by the aforesaid thermostatic member.

According to another feature of this invention a valve member normally seated by a spring is provided in the aforesaid chamber of the mixing device and adapted under any conditions of operation to prevent the hot water from the supply line to flow through the cold-water inlet passages.

According to a specific form of embodiment of this invention the two-cock mixing device of this invention comprises a tubular body disposed between a cold-water inlet and a hot-water inlet, said tubular body comprising two ducts, i.e. one for the cold-water complement and the other for the outlet downstream of the cock valve seats, said other duct communicating with outlet for the mixed water.

The thermostatic member disposed in a mixing chamber receiving hot water and the complementary quantity of cold water if necessary constitutes preferably an extensible capsule or tubular member filled with expansible liquid and adapted to actuate a practically sealed slide-valve or piston displaceable in a valve cylinder of which the lateral wall is formed with orifices communicating with the cold-water inlet for introducing the complementary cold water when said orifices are uncovered by said slide-valve. The extensible tubular member is preferably so positioned as to expand in a direction parallel to the longitudinal axis of the body of the device and at right angles to the axes of the water inlets. The fixed end portion of this tubular member is operatively connected to an external adjustment button or like member whereby the user may displace this fixed end as a function of the desired temperature of the water to be delivered by the device so as to vary the temperature of the mixed fluid beyond which the capsule of tubular member will allow complementary or compensation cold water to flow through the valve orifices.

In order to afford a clearer understanding of this invention and of the manner in which the same may be carried out in the practice, reference will now be made to the accompanying drawing forming part of this specification and illustrating diagrammatically by way of example a typical form of embodiment of the device. In the drawing:

FIG. 1 is a longitudinal section showing a mixing cock device constructed according to the teachings of this invention, which is of the type comprising two outlet cocks;

FIG. 2 is a cross-sectional view taken on line 2—2 of FIG. 1;

FIG. 3 is a cross-sectional view taken on line 3—3 of FIG. 1;

FIG. 4 is a cross-sectional view taken on line 4—4 of FIG. 1, but with the valve and control members omitted, and FIG. 5 is a fragmentary lateral view in longitudinal section and on a larger scale showing the component elements of the mixing cock device during its operation.

The body 1 of the mixing cock comprises a longitudinal inlet duct 2 and a longitudinal outlet duct 3 having an outlet union or nozzle 4. This body 1 has formed integrally thereon a pair of inlets 5, 6 for the hot water and cold water respectively registering with other integral necks 7, 8 respectively in which a hot-water cock and a cold-water cock are mounted, their corresponding handles 9, 10 and valve members 11, 12 being visible in the drawing. These valve members 11, 12 are adapted to co-act with seats 13, 14 separating the ducts 2, 3 from each other. The control handles 9, 10 are secured by means of screws 15, 16 on screw rods 17, 18 carrying the aforesaid valve members and engaging stationary nuts 19, 20 screwed in turn in the tapped necks 7, 8 as shown.

Fitted within the duct 2 is a tubular member 21 having one end welded to the bottom of this duct 2 at the left-hand extremity of FIG. 1 and its opposite end portion 21' engaging the wall of said duct and open on the side where the complemental cold water is to be supplied. This tubular member 21 has an opening 22 corresponding to the passage through the seat 13 and its opposite end has a set of orifices 45. Beyond the open end of this tubular member 21 and of the inlet 6 the duct 2 has a tapped extension 23 permitting the mounting of the inner members and receiving a closing plug 24 having an inner portion 25 extending into the duct 2 and formed with an axial bore. A gasket 26 is fitted in a peripheral groove formed in the aforesaid extension 25 to prevent the passage of cold water around this portion 25. Mounted within the tubular member 21 is another coaxial tube 29 having a cylindrical extension 39 of relatively small diameter formed in turn with an axial passage 40 closed by a welded screw plug 41.

Registering with the cold water inlet 6 is a milled portion of the wall of plug 24 which forms a plurality of apertures between the circular set of fins 27 connecting the portion 25 to the bottom 24. In this portion 25 and in the central portion between the fins 27 there is slidably fitted a slide-valve forming member 28 solid with the end portion of the extension 39 of tube 29 having secured by welding on its other end a bellows 30 closed by a bottom 31. The inner area of the tube 29 and bellows 30 is filled with an expansible liquid introduced through the passage 40. A compression spring 32 is interposed between the portion 25 and tube 29, the latter being formed if desired with an external hexagonal contour to enable it to be guided by the outer tubular member 21. The annular space between the outer tubular member 21 and the inner tube 29 constitutes the mixing chamber through which the hot water as well as the complementary quantity of cold water, if necessary, are caused to flow.

The outer face of bottom 31 is engaged by the inner square-shaped guide head 33 of a screw rod 34 non-rotatably engaging a tapped socket 38 carrying an external adjustment knob 35 of substantially cylindrical configuration. This adjustment knob 35 is formed with graduation lines registering with a fixed pointer or reference mark (not shown), formed on the body 1. The reference numeral 36 designates the screw by which the adjustment knob 35 is secured on the socket 38, the latter being retained in turn by a ring 37 screwed in a tapped portion of the body 1. The iner face of the aforesaid ring 37 is engaged by a shoulder of said socket and a sealing gasket is fitted in a groove formed in the larger portion of the socket.

Slidably mounted on the extension 39 of tube 29 and at the rear of the slide-valve 28 is a valve-forming member 42 normally urged against a seat 43 formed inside the end 25 of plug 24 by a coil spring 44 surrounding the aforesaid extension 39.

The operation of the apparatus described hereinabove in connection with the attached drawing is very simple. Assuming that the hot-water inlet 5 is connected to the outlet of an instantaneous gas water-heater fed with water under presusre, and that this heater is adjusted to deliver a limited output of water at a temperature at least equal in all cases to the maximum temperature contemplated by the user, for example 60° to 70° C. It may be assumed in addition that the adjustment knob 35 is so graduated that in its different angular positions the slide-valve forming member 28 is just at the limit of the solid wall of extension 25 on the cold-water inlet side when the temperature of the fluid in the mixing chamber is equal to that corresponding to that line of the graduation of knob 35 which registers with the stationary pointer or reference line. Under these conditions, if the hot-water cock 9 is wide open and if the temperature of the water in the mixing chamber exceeds that of the aforesaid graduation line, as the temperature of the water supplied by the water-heater is higher than the desired temperature, the thermostatic capsule will be expanded by the hot water penetrating through the orifices 45 into the tubular member 21 and consequently the slide-valve 28 will uncover the apertures in the plug 24, thus enabling a complementary quantity of cold water to flow from the cold-water inlet 6 into the mixing chamber until the temperature of the liquid in this chamber is restored to the desired value which causes the passage between the cold-water inlet 6 and the mixing chamber to be partially or fully throttled, the valve member 42 being in this case unseated by the cold-water pressure as the latter exceeds the pressure of the hot-water supply. The water in the mixing chamber, of which the temperature is thus adjusted automatically to the desired value will flow through the seat 13, the outlet passage 3 and the outlet union or nozzle 4. If desired, one or several outlet unions or nozzles 4 may be provided. Thus, the temperature of the water delivered by the device will be adjusted automatically, the handle 9 of the hot-water cock remaining in its fully-open position.

If only cold water is desired, the user will leave the hot-water cock 9 in its closed position and open the cold-water cock 10 alone.

It will be noted that when the slide-valve 28 is open if the hot-water pressure in the mixing chamber is equal to or higher than that of the cold-water, the valve 42 urged by the spring 44 and possibly under the influence of this water pressure difference will be seated and will thus prevent any hot water from flowing through the cold-water inlet passages, irrespective of the conditions of operation, notably when it is desired to draw cold water alone, even if the thermostatic member is still warm enough to open the slide-valve 28.

For gaging the thermostatic member it is sufficient to alter the setting of the drum-shaped knob 35 fitted on a tapered end of socket 38, after having unscrewed the locking screw 36, the latter being re-tightened upon completion of this operation.

We claim:

1. A device for mixing fluids of different temperatures and delivery of a fluid of a desired temperature comprising an elongated body having a pair of longitudinally extending ducts thereon, a hot fluid inlet opening adjacent one end thereof and a cold fluid inlet passage adjacent the opposite end of said body, said body hot fluid opening being in communication with one end portion of one of said ducts, an open end mixing chamber extending longitudinally of and within said one of said ducts and having an opening in one end portion thereof in communication with the opposite end portion of said one of said ducts, said mixing chamber open end positioned within said cold fluid inlet passage, a wall in said body extending from said body to said mixing chamber adjacent said mixing chamber opening and closing off said one of said ducts from said cold fluid inlet passage, said mixing chamber having a second opening in the end portion thereof opposite to said first mentioned mixing chamber opening and being in communication with the other of said ducts, an adjustable thermostatic member positioned within said mixing chamber and extending to said open end thereof, said body having an open end for the insertion of said mixing chamber and said thermostatic member in said body, a plug detachably closing said body open end and said mixing chamber open end, said plug having radial openings communicating with said cold fluid inlet openings and an axial recess in said plug opening into said mixing chamber and said radial openings, resilient means normally closing said plug recess, a valve slidably mounted in said plug recess connected to and controlled by said thermostatic means for at times closing said plug radial openings, manually controlled means for opening and closing said chamber second opening for controlling the communication of said mixing chamber with said second duct and said second duct having an outlet opening.

2. A device for mixing fluids as claimed in claim 1 wherein said second duct is in communication with said cold fluid inlet passage and manually controlled valve means is capable of closing off the communication between said cold fluid inlet passage and said second duct when desired.

3. A device for mixing hot and cold fluids and delivering a mixed fluid thereof of a desired temperature comprising an elongated body having a hot fluid inlet, a cold fluid inlet and a pair of ducts provided within and extending longitudinally of said body, said body hot fluid inlet opening into one of said ducts, an open end mixing chamber mounted in said duct and having said open end extending therefrom into said cold fluid inlet closing off said duct from said cold fluid inlet, an adjustable thermostatic member mounted in said mixing chamber, valve means mounted in the open end of said mixing chamber within said cold fluid inlet and operably connected to said thermostatic member for controlling the introduction of cold fluid from said cold fluid inlet to within said mixing chamber, said mixing chamber having openings in one end portion thereof within said duct placing the interior of said mixing chamber in communication with said hot fluid inlet through said duct, said mixing chamber having a further opening in the opposite end portion thereof, the other of said ducts having an opening in communication with said chamber further opening placing the interior of said chamber in communication with said other duct, said other duct having a second opening in communication with said cold fluid inlet, a pair of valves extending through said body for opening and closing said other duct openings and said other duct having an outlet opening.

4. A device for mixing hot fluid and cold fluid as claimed in claim 3, wherein a spring seated valve normally closes said mixing chamber open end against the flow of liquid from said mixing chamber therethrough but permitting the passage of cold fluid therein from said cold fluid inlet.

References Cited in the file of this patent

UNITED STATES PATENTS

| | | |
|---|---|---|
| 1,942,270 | Resek | Jan. 2, 1934 |
| 2,526,099 | Vinson | Oct. 17, 1950 |
| 2,669,391 | Kelsch | Feb. 16, 1954 |
| 2,672,157 | Branson | Mar. 16, 1954 |
| 2,879,943 | Dubitzky et al. | Mar. 31, 1959 |